United States Patent
Li et al.

(10) Patent No.: US 12,081,349 B2
(45) Date of Patent: Sep. 3, 2024

(54) OPTICAL NETWORK UNIT AND PoE POWER SUPPLY SYSTEM

(71) Applicant: Huawei Technologies Co., Ltd., Shenzhen (CN)

(72) Inventors: Jinbo Li, Wuhan (CN); Zelin Wang, Dongguan (CN); Xiaofei Zeng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 62 days.

(21) Appl. No.: 17/937,038

(22) Filed: Sep. 30, 2022

(65) Prior Publication Data

US 2023/0024989 A1 Jan. 26, 2023

Related U.S. Application Data

(63) Continuation of application No. PCT/CN2020/132706, filed on Nov. 30, 2020.

(30) Foreign Application Priority Data

Apr. 3, 2020 (CN) .......................... 202010262558.2

(51) Int. Cl.
*G06F 1/00* (2006.01)
*H04L 12/10* (2006.01)
*H04Q 11/00* (2006.01)
*G06F 1/3203* (2019.01)

(52) U.S. Cl.
CPC ......... *H04L 12/10* (2013.01); *H04Q 11/0067* (2013.01); *G06F 1/3203* (2013.01); *H04Q 2213/1308* (2013.01)

(58) Field of Classification Search
CPC ............... H04L 12/10; H04Q 11/0067; H04Q 2213/1308; H04Q 2213/1301; H04Q 2213/13389; H04Q 11/00; H04B 10/272; H04B 10/808
USPC .......................................................... 713/300
See application file for complete search history.

(56) References Cited

U.S. PATENT DOCUMENTS

| | | | | |
|---|---|---|---|---|
| 10,880,125 B2 * | 12/2020 | Mather | .................... | H04L 43/10 |
| 11,876,382 B2 * | 1/2024 | Gu | ............................ | H02J 4/00 |
| 2008/0062586 A1 * | 3/2008 | Apfel | ..................... | H04L 12/10 |
| | | | | 361/18 |
| 2014/0258742 A1 * | 9/2014 | Chien | ..................... | H04L 12/10 |
| | | | | 713/300 |

(Continued)

FOREIGN PATENT DOCUMENTS

| CN | 104579700 A | 4/2015 |
|---|---|---|
| CN | 105048439 A | 11/2015 |

(Continued)

*Primary Examiner* — Volvick Derose
(74) *Attorney, Agent, or Firm* — Slater Matsil, LLP (57) ABSTRACT

Embodiments of this application disclose an optical network unit and a PoE power supply system. The optical network unit in embodiments of this application includes a conductive connection terminal, a switch module, a network transformer, a first voltage conversion module, and a network interface connector. The conductive connection terminal is configured to be connected to a power over Ethernet PoE power supply device, and the conductive connection terminal is connected to the network transformer.

20 Claims, 6 Drawing Sheets

(56) References Cited

U.S. PATENT DOCUMENTS

| | | | |
|---|---|---|---|
| 2015/0078740 A1* | 3/2015 | Sipes, Jr. | H04L 12/10 398/16 |
| 2016/0020911 A1* | 1/2016 | Sipes, Jr. | H04B 10/40 398/16 |
| 2017/0117971 A1* | 4/2017 | Sipes, Jr. | G02B 6/3817 |
| 2018/0219635 A1* | 8/2018 | Sipes, Jr. | G02B 6/4416 |
| 2019/0147202 A1* | 5/2019 | Harney | H04B 1/3805 235/375 |
| 2020/0067605 A1 | 2/2020 | Torres et al. | |
| 2020/0294746 A1* | 9/2020 | Wang | H04L 12/10 |
| 2022/0052767 A1* | 2/2022 | Sipes, Jr. | H04N 21/6118 |
| 2023/0288654 A1* | 9/2023 | Ge | H01R 12/7088 |

FOREIGN PATENT DOCUMENTS

| | | |
|---|---|---|
| CN | 109194492 A | 1/2019 |
| EP | 3723266 A1 | 10/2020 |
| WO | 2019109653 A1 | 6/2019 |

\* cited by examiner

OPTICAL NETWORK UNIT AND PoE POWER SUPPLY SYSTEM

CROSS-REFERENCE TO RELATED APPLICATIONS

This application a continuation of International Application No. PCT/CN2020/132706, filed on Nov. 30, 2020, which claims priority to Chinese Patent Application No. 202010262558.2, filed on Apr. 3, 2020. The disclosures of the aforementioned applications are hereby incorporated by reference in their entireties.

TECHNICAL FIELD

Embodiments of this application relate to the field of communications technologies, and in particular, to an optical network unit and a PoE power supply system.

BACKGROUND

With the development of a fifth generation communications technology and a next generation fixed network, fiber optic communications becomes the mainstream. However, currently, a plurality of power over Ethernet PoE terminal devices are provided only with a network interface connector, and are not provided with a communications interface, and therefore cannot be directly connected to an optical fiber.

To implement fiber optic communications of the PoE terminal device, a relay device usually needs to be added. The relay device is connected to the optical fiber, and is connected to the PoE terminal device through a network interface.

However, an existing relay device usually obtains power locally, and consequently remote power supply to the PoE terminal device cannot be implemented.

SUMMARY

Embodiments of this application provide an optical network unit and a PoE power supply system, to remotely supply power to a PoE terminal device.

A first aspect of embodiments of this application provides an optical network unit, including a conductive connection terminal, a switch module, a network transformer, a first voltage conversion module, and a network interface connector.

The conductive connection terminal is configured to be connected to a power over Ethernet PoE power supply device. Specifically, the conductive connection terminal may be connected to the PoE power supply device by using a cable.

The conductive connection terminal is connected to the network transformer, and the network transformer is connected to the network interface connector.

The network interface connector is configured to be connected to a PoE terminal device. Specifically, the network interface connector may be connected to the PoE terminal device by using a network cable.

The conductive connection terminal is further connected to the first voltage conversion module by using the switch module. The switch module may be a switching transistor, and there may be a plurality of structures for the first voltage conversion module.

Before a handshake between the PoE power supply device and the PoE terminal device is completed, the switch module is in an open state. After the handshake between the PoE power supply device and the PoE terminal device is completed, the switch module is in a closed state.

In this embodiment of this application, the conductive connection terminal is connected to the PoE power supply device and the PoE terminal device, to implement that the PoE power supply device remotely supplies power to the PoE terminal device. In addition, the conductive connection terminal is further connected to the first voltage conversion module, to supply power to another component in the optical network unit.

Based on the first aspect, this embodiment of this application provides a first implementation of the first aspect. In this implementation, the switch module includes a first resistor, a second resistor, and a switching transistor. The switching transistor may be a MOS transistor.

The conductive connection terminal includes a positive terminal and a negative terminal.

A first terminal of the first resistor is connected to the positive terminal, a second terminal of the first resistor is connected to a first terminal of the second resistor, and a second terminal of the second resistor is connected to the negative terminal.

A first electrode of the switching transistor is connected to the negative terminal of the conductive connection terminal, a second electrode of the switching transistor is connected to a first terminal of the first voltage conversion module, and a control electrode of the switching transistor is connected to the second terminal of the first resistor.

A second terminal of the first voltage conversion module is connected to the positive terminal.

Resistance of the first resistor and resistance of the second resistor are properly selected, so that before the handshake between the PoE power supply device and the PoE terminal device is completed, a voltage of the control electrode of the switching transistor is less than a threshold voltage, where in this case, the switching transistor is cut off, and the first voltage conversion module is powered off; and after the handshake between the PoE power supply device and the PoE terminal device is completed, the voltage of the control electrode of the switching transistor is greater than or equal to the threshold voltage, where in this case, the switching transistor is conducted, and the first voltage conversion module is powered on for work.

This embodiment of this application provides a feasible solution for the switch module. In this solution, a ratio of the resistance of the first resistor to the resistance of the second resistor is controlled to control the voltage of the control electrode of the switching transistor.

Based on the first implementation of the first aspect, this embodiment of this application provides a second implementation of the first aspect. In this implementation, the network transformer includes a first coil and a second coil.

The positive terminal of the conductive connection terminal may be connected to a central tap of a primary-side winding of the first coil, and the negative terminal of the conductive connection terminal may be connected to a central tap of a primary-side winding of the second coil.

A central tap of a secondary-side winding of the first coil is connected to a first terminal of the network interface connector, and a central tap of a secondary-side winding of the second coil is connected to a second terminal of the network interface connector.

This embodiment of this application provides a feasible solution for the network transformer.

Based on the first implementation of the first aspect or the second implementation of the first aspect, this embodiment of this application provides a third implementation of the first aspect. In this implementation, the optical network unit further includes a control module.

A first terminal of the control module is connected to a third terminal of the first voltage conversion module. In other words, the control module is powered by using the first voltage conversion module.

A second terminal of the control module is connected to the control electrode of the switching transistor, and is configured to control, when the PoE terminal device is powered off, the voltage of the control electrode of the switching transistor to be less than the threshold voltage.

When the PoE terminal device is powered off, the control module controls the voltage of the control electrode of the switching transistor to be less than the threshold voltage, so that the switching transistor is cut off, to avoid imposing impact on a case in which the PoE power supply device detects that the PoE terminal device is powered off.

Based on the third implementation of the first aspect, this embodiment of this application provides a fourth implementation of the first aspect. The optical network unit further includes a first isolation module. There may be a plurality of structures for the first isolation module. For example, an opto-isolator may be included.

One terminal of the first isolation module is connected to the second terminal of the control module, and the other terminal is connected to the control electrode of the switching transistor.

In this implementation, the switch module is electrically isolated from the control module by using the first isolation module.

Based on the third implementation of the first aspect or the fourth implementation of the first aspect, this embodiment of this application provides a fifth implementation of the first aspect. In this implementation, the optical network unit further includes a sampling module and a second voltage conversion module. There may be a plurality of structures for each of the sampling module and the second voltage conversion module.

A first terminal of the second voltage conversion module is connected to the second electrode of the switching transistor, a second terminal of the second voltage conversion module is connected to the positive terminal, and a third terminal of the second voltage conversion module is connected to a first terminal of the sampling module.

A second terminal of the sampling module is connected to the positive terminal of the conductive connection terminal or the negative terminal of the conductive connection terminal, and a third terminal of the sampling module is connected to the network transformer.

A third terminal of the control module is connected to a fourth terminal of the sampling module, and is configured to determine, based on a signal at the fourth terminal of the sampling module, that the PoE terminal device is powered off. The signal at the fourth terminal of the sampling module may include a current signal or a power signal.

This embodiment of this application provides a feasible solution for determining that the PoE terminal device is powered off. That is, the sampling module obtains a current signal between the conductive connection terminal and the network transformer, and the control module determines, based on the current signal, that the PoE terminal device is powered off.

Based on the fifth implementation of the first aspect, this embodiment of this application provides a sixth implementation of the first aspect. The optical network unit further includes a second isolation module. There may be a plurality of structures for the second isolation module. For example, an opto-isolator may be included.

One terminal of the second isolation module is connected to the fourth terminal of the sampling module, and the other terminal of the second isolation module is connected to the third terminal of the control module.

In this implementation, the sampling module is electrically isolated from the control module by using the second isolation module.

Based on the fifth implementation of the first aspect or the sixth implementation of the first aspect, this embodiment of this application provides a seventh implementation of the first aspect. In this implementation, the sampling module includes a sampling resistor and a sampling submodule. There may be a plurality of structures for the sampling submodule. This is not limited in this embodiment of this application.

A first terminal of the sampling resistor is connected to the positive terminal of the conductive connection terminal or the negative terminal of the conductive connection terminal, and a second terminal of the sampling resistor is connected to the network transformer.

A first terminal of the sampling submodule is connected to the first terminal of the sampling resistor, a second terminal of the sampling submodule is connected to the second terminal of the sampling resistor, and the sampling submodule is configured to collect a circuit signal related to the sampling resistor.

A third terminal of the sampling submodule is connected to the third terminal of the second voltage conversion module. In other words, the sampling submodule is powered by using the second voltage conversion module.

A fourth terminal of the sampling submodule is connected to the third terminal of the control module, and is configured to transmit a sampled signal to the control module.

The control module is configured to determine, based on a signal at the fourth terminal of the sampling submodule, that the PoE terminal device is powered off.

This embodiment of this application provides a feasible solution for the sampling module.

Based on the third implementation of the first aspect, the fourth implementation of the first aspect, the fifth implementation of the first aspect, the sixth implementation of the first aspect, or the seventh implementation of the first aspect, this embodiment of this application provides an eighth implementation of the first aspect. In this implementation, the optical network unit further includes an energy storage module. The energy storage module may be a capacitor.

A first terminal of the energy storage module is connected to the second terminal of the control module, and a second terminal of the energy storage module is grounded.

In this implementation, when the PoE terminal device is powered off, the energy storage module is configured to maintain the voltage of the control electrode of the switching transistor in a range less than the threshold voltage, to ensure that there is enough time for the PoE power supply device to detect that the PoE terminal device is powered off.

Based on the first aspect, the first implementation of the first aspect, the second implementation of the first aspect, the third implementation of the first aspect, the fourth implementation of the first aspect, the fifth implementation of the first aspect, the sixth implementation of the first aspect, the seventh implementation of the first aspect, or the eighth implementation of the first aspect, this embodiment of this application provides a ninth implementation of the first aspect. In this implementation, the optical network unit further includes the control module and an optical-to-electrical conversion module.

The optical-to-electrical conversion module is configured to be connected to an optical line terminal, and is configured to convert an optical signal from the optical line terminal into an electrical signal.

The optical-to-electrical conversion module is connected to the control module, and the control module is connected to the network transformer.

The first voltage conversion module is connected to the control module.

In this implementation, the control module processes the electrical signal, and sends the processed electrical signal to the network interface connector by using the network transformer, to transmit the electrical signal to the PoE terminal device.

A second aspect of embodiments of this application provides a PoE power supply system, including a PoE power supply device and the optical network unit in any one of the foregoing implementations.

The PoE power supply device is connected to a conductive connection terminal in the optical network unit.

In this embodiment of this application, the PoE power supply device supplies power to a PoE terminal device by using the optical network unit.

Based on the second aspect, this embodiment of this application provides a first implementation of the second aspect. In this implementation, the PoE power supply system further includes an optical line terminal.

The optical line terminal may be connected to an optical-to-electrical conversion module in the optical network unit by using an optical fiber.

In this embodiment of this application, the optical line terminal transmits a signal to the PoE terminal device by using the optical network unit.

Based on the second aspect, this embodiment of this application provides a second implementation of the second aspect. In this implementation, the optical line terminal is connected to an input terminal of the PoE power supply device by using the optical fiber.

An output terminal of the PoE power supply device is connected to the optical network unit by using a photoelectric hybrid cable.

An optical fiber in the photoelectric hybrid cable is connected to the optical-to-electrical conversion module in the optical network unit.

A cable in the photoelectric hybrid cable is connected to the conductive connection terminal in the optical network unit.

In this embodiment of this application, the optical line terminal is connected to the PoE power supply device by using the optical fiber, and the PoE power supply device is connected to the optical network unit by using the photoelectric hybrid cable, to transmit a signal to the PoE terminal device and supply power to the PoE terminal device by using the PoE power supply device.

It can be learned from the foregoing technical solutions that embodiments of this application have the following advantages:

The conductive connection terminal is configured to be connected to the power over Ethernet PoE power supply device, the conductive connection terminal is connected to the network transformer, the network transformer is connected to the network interface connector, and the network interface connector is configured to be connected to the PoE terminal device. Therefore, the PoE power supply device may supply power to the PoE terminal device. The conductive connection terminal is further connected to the first voltage conversion module by using the switch module, and therefore the PoE power supply device may supply power to a component in the optical network unit. Before the handshake between the PoE power supply device and the PoE terminal device is completed, the switch module is in the open state, to avoid a case in which the optical network device unit affects a handshake process between the PoE power supply device and the PoE terminal device. After the handshake between the PoE power supply device and the PoE terminal device is completed, the switch module is in the closed state, to supply power to the PoE terminal device. Therefore, the optical network unit can supply power to the PoE terminal device. In addition, the optical network unit is also powered by the PoE power supply device, and does not need to obtain power locally, in other words, a distance between the optical network unit and the PoE power supply device is not limited, and therefore the optical network unit may be installed at a position relatively close to the PoE terminal device, to remotely supply power to the PoE terminal device.

DETAILED DESCRIPTION OF ILLUSTRATIVE EMBODIMENTS

Embodiments of this application provide an optical network unit and a PoE power supply system, to remotely supply power to a PoE terminal device.

Figure 1:
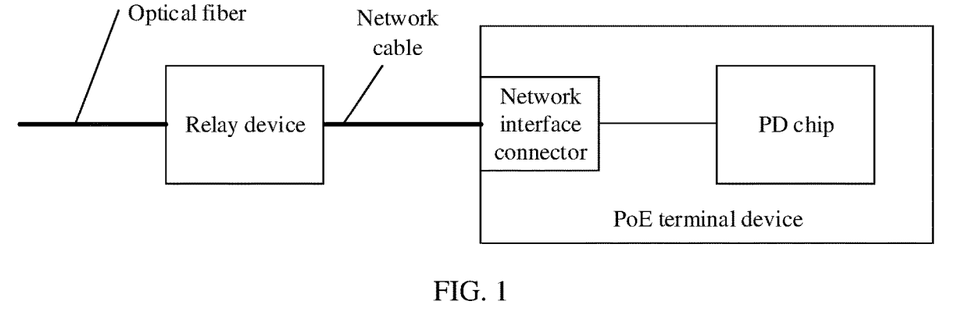
FIG. 1 is a schematic diagram of an architecture of a communications system according to an embodiment of this application.

Embodiments of this application may be applied to a communications system shown in FIG. 1. The system includes a relay device and a power over Ethernet PoE terminal device.

The PoE terminal device includes a network interface connector and a powered device (PD) chip. The network interface connector is connected to the PD chip. For example, the network interface connector may be connected to the PD chip by using a network transformer.

A first terminal of the relay device is connected to an optical fiber, and a second terminal of the relay device is connected to the network interface connector in the PoE terminal device by using a network cable. The relay device transmits a signal to the PoE terminal device by using the network cable, and supplies power to the PoE terminal device. A longer length of a network cable indicates a greater loss and stronger signal interference. Therefore, to ensure a relatively high signal transmission rate, a length of the network cable between the relay device and the PoE terminal device should not be excessively long, in other words, a remote distance is limited. Based on this, if the relay device obtains power locally, remote power supply to the PoE terminal device cannot be implemented.

Therefore, embodiments of this application provide an optical network unit as a relay device. One terminal of the optical network unit is connected to a PoE power supply device by using a cable, and the other terminal is connected to a PoE terminal device by using a network cable, to supply power to the PoE terminal device. In addition, the optical network unit is also powered by the PoE power supply device. A distance between the optical network unit and the PoE power supply device is not limited, and therefore the optical network unit may be installed at a position relatively close to the PoE terminal device, to remotely supply power to the PoE terminal device.

In the communications system shown in FIG. 1, the PoE terminal device may include a plurality of terminal devices such as a wireless access point (AP), a camera, a traffic signal light, and a remote radio unit (RRU).

Figure 2:
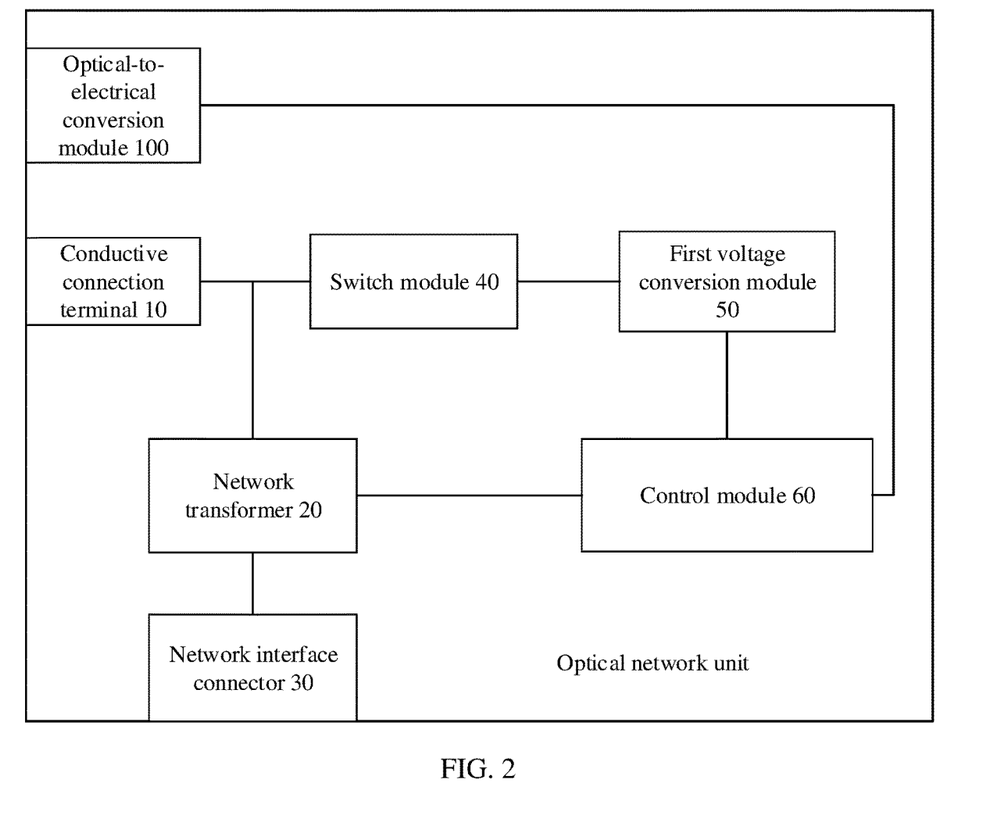
FIG. 2 is a schematic diagram of a structure of a first embodiment of an optical network unit according to an embodiment of this application.

A structure of the optical network unit is described below in detail. FIG. 2 is a schematic diagram of a structure of an embodiment of an optical network unit according to an embodiment of this application. As shown in FIG. 2, this embodiment of this application provides an embodiment of the optical network unit, including a conductive connection terminal 10, a switch module 40, a network transformer 20, a first voltage conversion module 50, and a network interface connector 30.

The conductive connection terminal 10 is configured to be connected to a power over Ethernet PoE power supply device. The PoE power supply device is a power supply device based on a PoE protocol.

The conductive connection terminal 10 may be connected to the PoE power supply device by using a cable. For example, the conductive connection terminal 10 may include a positive terminal 11 and a negative terminal 12. It may be understood that the positive terminal 11 of the conductive connection terminal 10 may be connected to a positive terminal of the PoE power supply device by using a positive power cable in the cable, and the negative terminal 12 of the conductive connection terminal 10 may be connected to a negative terminal of the PoE power supply device by using a negative power cable in the cable.

The conductive connection terminal 10 is connected to the network transformer 20. There may be a plurality of structures for the network transformer 20. Correspondingly, the conductive connection terminal 10 may be connected to the network transformer 20 in a plurality of manners. This is described below in detail.

Figure 3:
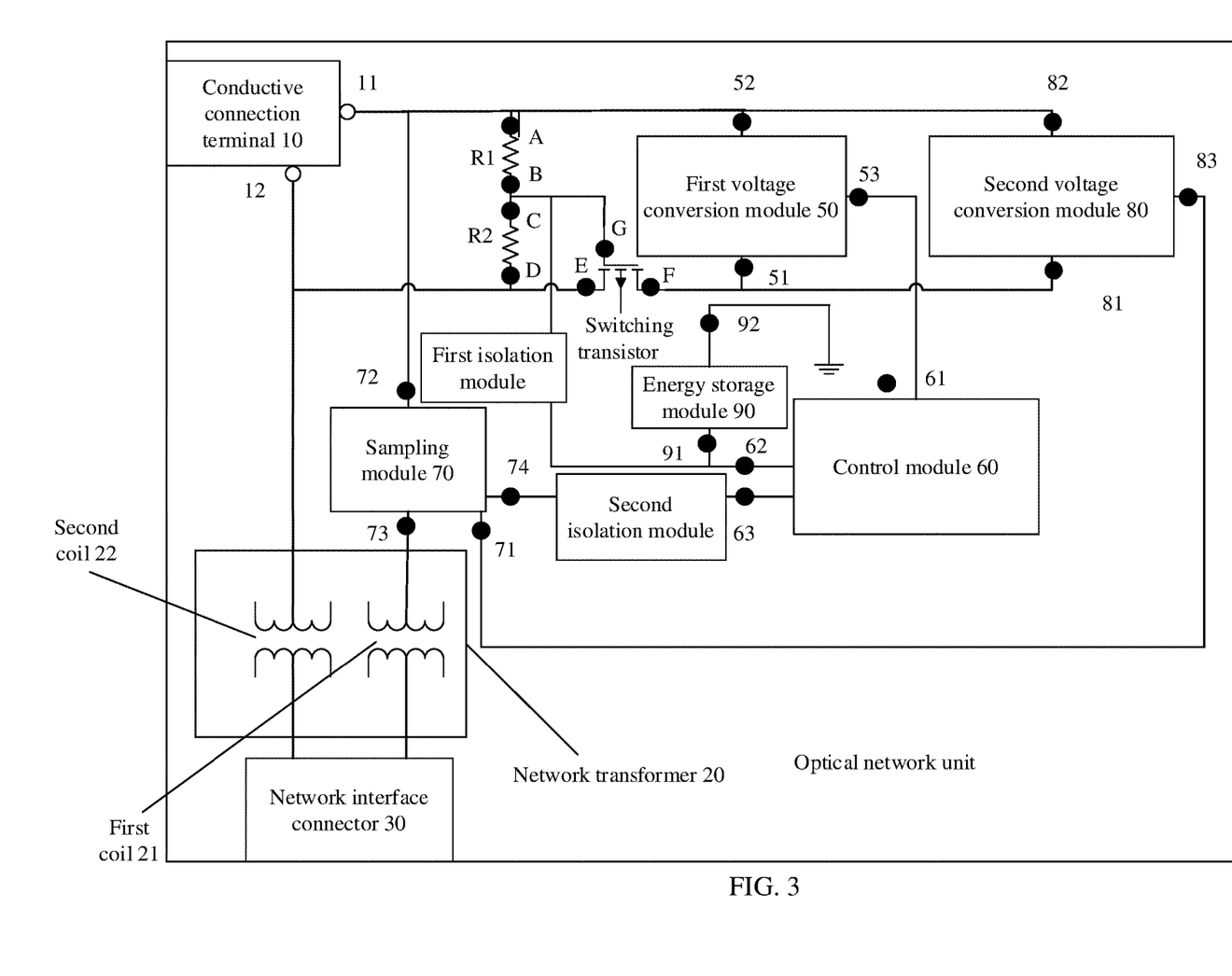
FIG. 3 is a schematic diagram of a structure of a second embodiment of an optical network unit according to an embodiment of this application.

For example, as shown in FIG. 3, the network transformer 20 includes a first coil 21 and a second coil 22. The first coil 21 and the second coil 22 may be integrated into one module, or may be respectively deployed in two modules.

The first coil 21 may be mounted in a plurality of manners. This is not specifically limited in this embodiment of this application. For example, the first coil 21 may be wrapped around a magnetic ring or a magnetic cylinder.

Similarly, the second coil 22 may be mounted in a plurality of manners. This is not specifically limited in this embodiment of this application. For example, the second coil 22 may be wrapped around a magnetic ring or a magnetic cylinder.

The positive terminal 11 of the conductive connection terminal 10 may be connected to a central tap of a primary-side winding of the first coil 21, and the negative terminal 12 of the conductive connection terminal 10 may be connected to a central tap of a primary-side winding of the second coil 22.

The network transformer 20 is connected to the network interface connector 30.

For example, the network transformer 20 includes the first coil 21 and the second coil 22. A central tap of a secondary-side winding of the first coil 21 is connected to a first terminal of the network interface connector 30, and a central tap of a secondary-side winding of the second coil 22 is connected to a second terminal of the network interface connector 30.

The network interface connector 30 is configured to be connected to a PoE terminal device. The PoE terminal device is a powered device to which power is supplied based on the PoE protocol.

The network interface connector 30 in the optical network unit may be connected to the PoE terminal device by using a network cable.

It may be learned from the foregoing description that in this embodiment of this application, the PoE power supply device, the conductive connection terminal 10, the network transformer 20, the network interface connector 30, and the PoE terminal device are sequentially connected, so that the PoE power supply device can supply power to the PoE terminal device.

A process in which the PoE power supply device supplies power to the PoE terminal device may include a power-on process and a power-off process. The power-on process is first described below.

Specifically, the power-on process may include: The PoE power supply device first detects a PoE terminal device with a PD characteristic, and then performs a handshake with the PoE terminal device based on the PoE protocol. A handshake process may be considered as a process in which the PoE power supply device gradually increases a supply voltage, so that a voltage of the PoE terminal device starts from 0, changes for one or more times, and finally increases to a preset voltage V1. It should be noted that in this embodiment of this application, a quantity of times the voltage of the PoE terminal device changes and amplitude at each time of change are not specifically limited, and may be adjusted based on an actual requirement.

Figure 4:
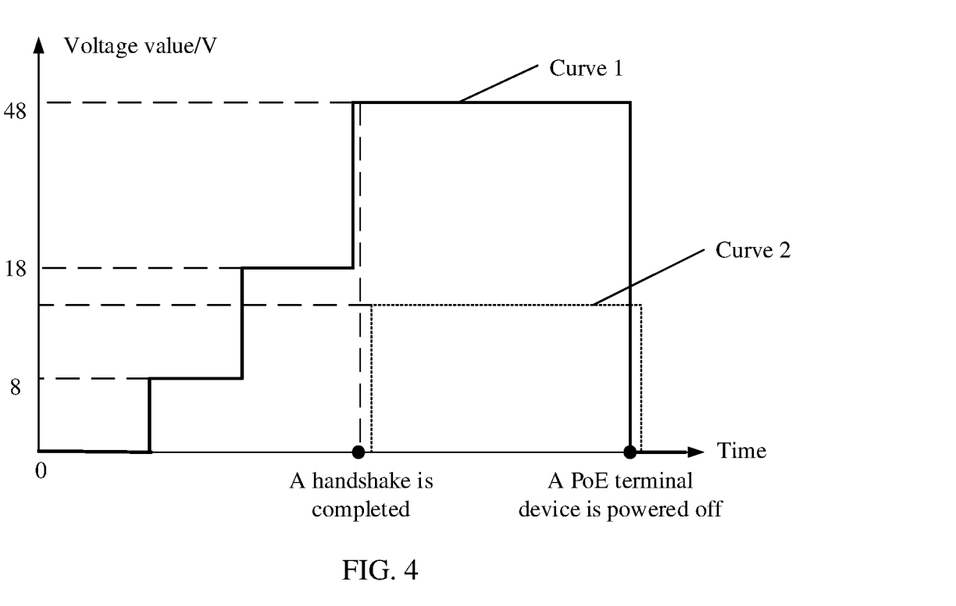
FIG. 4 is a schematic diagram of a voltage change according to an embodiment of this application.

FIG. 4 is used as an example. In FIG. 4, a curve 1 represents a process, in the handshake process, in which the voltage of the PoE terminal device changes. It may be learned from the curve 1 that the voltage of the PoE terminal device first increases from 0 V to 8 V, and then increases to 18 V. After the handshake is completed, the voltage of the PoE terminal device stabilizes at 48 V.

In addition to being connected to the network transformer 20, the conductive connection terminal 10 is further connected to the first voltage conversion module 50 by using the switch module 40. There may be a plurality of structures for the switch module 40. This is not limited in this embodiment of this application. The structure of the switch module 40 is described below in detail with reference to FIG. 3.

The first voltage conversion module 50 is configured to convert a supply voltage into an internal voltage, to supply power to a component in the optical network unit. The first voltage conversion module 50 may include one or more output terminals. When the first voltage conversion module 50 includes a plurality of output terminals, the first voltage conversion module 50 may output a plurality of voltages.

It should be noted that the PoE protocol determines a process in which the PoE power supply device detects the PoE terminal device, and determines that there is a one-to-one handshake process between the PoE power supply device and the PoE terminal device, in other words, one PoE power supply device can detect only one PoE terminal device, and can perform a handshake only with the one PoE terminal device. In this embodiment of this application, in addition to supplying power to the PoE terminal device, the PoE power supply device further supplies power to the optical network unit. Therefore, to avoid affecting the process in which the PoE power supply device detects the PoE terminal device and affecting the handshake process between the PoE power supply device and the PoE terminal device, before the handshake between the PoE power supply device and the PoE terminal device is completed, the switch module 40 is in an open state, and the first voltage conversion module 50 is in a power-off state, so that the process in which the PoE power supply device detects the PoE terminal device and the handshake process between the PoE power supply device and the PoE terminal device may be normally performed.

After the handshake between the PoE power supply device and the PoE terminal device is completed, the switch module 40 is in a closed state, and the first voltage conversion module 50 is in a power-on state, so that the PoE power supply device supplies power to both the PoE terminal device and the component in the optical network unit.

As shown in FIG. 4, a curve 2 in FIG. 4 represents a process in which an input voltage of the first voltage conversion module 50 changes. It may be learned from the curve 2 that before the handshake between the PoE power supply device and the PoE terminal device is completed, a voltage at an input terminal of the first voltage conversion module 50 is 0, and after the handshake between the PoE power supply device and the PoE terminal device is completed, the voltage at the input terminal of the first voltage conversion module 50 is V2.

In this embodiment of this application, before the handshake between the PoE power supply device and the PoE terminal device is completed, the switch module 40 is in the open state, so that the handshake process between the PoE power supply device and the PoE terminal device may be normally performed. After the handshake between the PoE power supply device and the PoE terminal device is completed, the PoE power supply device may supply power to the PoE terminal device, and the switch module 40 is in the closed state, and therefore the PoE power supply device may further supply power to the optical network unit.

Further, the PoE power supply device may supply power to the optical network unit by using a cable. Therefore, a distance between the optical network unit and the PoE power supply device is not limited, and the optical network unit may be installed at a position relatively close to the PoE terminal device, to remotely supply power to the PoE terminal device.

The structure of the switch module 40 is described below with reference to FIG. 3. As shown in FIG. 3, the switch module 40 includes a first resistor R1, a second resistor R2, and a switching transistor. The switching transistor may be a MOS transistor. The conductive connection terminal 10 includes the positive terminal and the negative terminal.

A first terminal A of the first resistor R1 is connected to the positive terminal 11 of the conductive connection terminal 10, a second terminal B of the first resistor R1 is connected to a first terminal C of the second resistor R2, and a second terminal D of the second resistor R2 is connected to the negative terminal 12 of the conductive connection terminal 10.

A first electrode E of the switching transistor is connected to the negative terminal 12 of the conductive connection terminal 10, a second electrode F of the switching transistor is connected to a first terminal 51 of the first voltage conversion module 50, and a control electrode G of the switching transistor is connected to the second terminal B of the first resistor R1. If the switching transistor is a MOS transistor, the first electrode E of the switching transistor may be a source, and the second electrode F of the switching transistor may be a drain.

A second terminal 52 of the first voltage conversion module 50 is connected to the positive terminal 11 of the conductive connection terminal 10.

It may be learned from the foregoing connection relationship that a voltage between both terminals of each of the first resistor R1 and the second resistor R2 is equal to a voltage between the positive terminal 11 of the conductive connection terminal 10 and the negative terminal 12 of the conductive connection terminal 10. The control electrode G of the switching transistor is connected to the second terminal B of the first resistor R1, and therefore a ratio of resistance of the first resistor R1 to resistance of the second resistor R2 may be controlled to control a voltage of the control electrode G of the switching transistor in the handshake process.

Specifically, before the handshake between the PoE power supply device and the PoE terminal device is completed, the voltage of the control electrode G of the switching transistor is less than a threshold voltage, so that the switching transistor is cut off. In this case, the first voltage conversion module 50 is in the power-off state, and therefore the PoE power supply device cannot supply power to another component in the optical network unit, and the handshake between the PoE power supply device and the PoE terminal device may be normally performed.

After the handshake between the PoE power supply device and the PoE terminal device is completed, the voltage of the control electrode G of the switching transistor is greater than or equal to the threshold voltage, so that the switching transistor is conducted. In this case, the first voltage conversion module 50 is in the power-on state, and the PoE power supply device may supply power to the component in the optical network unit.

In this embodiment of this application, the first resistor R1 and the second resistor R2 with proper resistance are selected, so that before the handshake between the PoE power supply device and the PoE terminal device is completed, the voltage of the control electrode G of the switching transistor is less than the threshold voltage, to ensure that the handshake between the PoE power supply device and the PoE terminal device may be normally performed; and after the handshake between the PoE power supply device and the PoE terminal device is completed, the voltage of the control electrode G of the switching transistor is greater than or equal to the threshold voltage, to implement that the PoE power supply device supplies power to both the PoE terminal device and the optical network unit.

The power-off process is contrary to the power-on process, and may include: The PoE power supply device first detects that the PoE terminal device is powered off, and then gradually decreases the supply voltage to 0. There may be a plurality of cases in which the PoE terminal device is powered off. For example, a network cable between the optical network unit and the PoE terminal device is disconnected.

It may be learned from the foregoing description related to the PoE protocol that there also needs to be a one-to-one process in which the PoE power supply device detects that the PoE terminal device is powered off. Therefore, when the PoE terminal device is powered off, the switch module 40 in the optical network unit needs to be controlled to be open, to ensure that the PoE power supply device can detect that the PoE terminal device is powered off.

Therefore, as shown in FIG. 4, in another embodiment of the optical network unit provided in this embodiment of this application, the optical network unit further includes a control module 60. The control module 60 is configured to control, when the PoE terminal device is powered off, the switch module 40 to be open.

Specifically, a first terminal 61 of the control module 60 is connected to a third terminal 53 of the first voltage conversion module 50. That is, the first voltage conversion module 50 converts the voltage between the positive terminal 11 of the conductive connection terminal 10 and the negative terminal 12 of the conductive connection terminal 10 into a voltage required by the control module 60, to supply power to the control module 60.

A second terminal 62 of the control module 60 is connected to the control electrode G of the switching transistor, and is configured to control, when the PoE terminal device is powered off, the voltage of the control electrode G of the switching transistor to be less than the threshold voltage, so that the switching transistor is cut off. In this case, the first voltage conversion module 50 is powered off. It may be learned from the curve 2 in FIG. 4 that the voltage of the first voltage conversion module 50 decreases to 0 after the PoE terminal device is powered off. In this case, the PoE power supply device stops supplying power to the optical network unit, and the PoE power supply device may perform one-to-one detection on the PoE terminal device, to determine that the PoE terminal device is powered off.

It should be noted that the switch module 40 is directly connected to the conductive connection terminal 10, and the control module 60 is connected to the conductive connection terminal 10 by using the first voltage conversion module 50, and therefore a voltage level of the control module 60 is different from that of the switch module 40. Therefore, the optical network unit in this embodiment of this application may further include a first isolation module. The first isolation module is disposed between the second terminal 62 of the control module 60 and the control electrode G of the switching transistor, and the first isolation module is configured to perform electric isolation. There may be a plurality of structures for the first isolation module. This is not specifically limited in this embodiment of this application. For example, an opto-isolator may be included.

It may be learned from the foregoing description that the control module 60 needs to control, when the PoE terminal device is powered off, the switch module 40 to be open. Therefore, the control module 60 needs to first determine that the PoE terminal device is powered off. There are a plurality of methods for determining, by the control module 60, that the PoE terminal device is powered off. For example, if there is signal transmission between the control module 60 and the PoE terminal device, when signal transmission is interrupted, the control module 60 may determine that the PoE terminal device is powered off.

For another example, the conductive connection terminal 10 is electrically connected to the network transformer 20, to supply power to the PoE terminal device, and therefore a current between the conductive connection terminal 10 and the network transformer 20 may be sampled by using a sampling module 70, and then the control module 60 determines, based on a sampling result, that the PoE terminal device is powered off.

Specifically, as shown in FIG. 3, in another embodiment of the optical network unit provided in this embodiment of this application, the optical network unit further includes the sampling module 70 and a second voltage conversion module 80.

A first terminal 81 of the second voltage conversion module 80 is connected to the second electrode F of the switching transistor, a second terminal 82 of the second voltage conversion module 80 is connected to the positive terminal 11 of the conductive connection terminal, and a third terminal 83 of the second voltage conversion module 80 is connected to a first terminal 71 of the sampling module 70.

It may be understood that the second voltage conversion module 80 is connected in parallel to the first voltage conversion module 50, and the second voltage conversion module 80 is configured to convert the voltage between the positive terminal 11 of the conductive connection terminal and the negative terminal 12 of the conductive connection terminal into an input voltage of the sampling module 70, to supply power to the sampling module 70.

There may be a plurality of structures for the second voltage conversion module 80. This is not limited in this embodiment of this application.

A second terminal 72 of the sampling module 70 is connected to the positive terminal 11 of the conductive connection terminal 10 or the negative terminal 12 of the conductive connection terminal 10, and a third terminal 73 of the sampling module 70 is connected to the network transformer 20. In FIG. 3, the second terminal 72 of the sampling module 70 is connected to the positive terminal 11 of the conductive connection terminal 10, and the sampling module 70 is connected to the central tap of the primary-side winding of the first coil 21 in the network transformer 20.

A third terminal 63 of the control module 60 is connected to a fourth terminal 74 of the sampling module 70, and is configured to determine, based on a signal at the fourth terminal 74 of the sampling module 70, that the PoE terminal device is powered off.

It may be learned from the foregoing connection relationship that the second terminal 72 of the sampling module 70 and the third terminal 73 of the sampling module 70 serve as two input terminals, and are respectively connected to the conductive connection terminal 10 and the network transformer 20, to collect a circuit signal between the conductive connection terminal 10 and the network transformer 20. The fourth terminal 74 of the sampling module 70 serves as an output terminal, and outputs the circuit signal (namely, a sampled signal) between the conductive connection terminal 10 and the network transformer 20 to the control module 60, so that the control module 60 determines, based on the sampled signal, that the PoE terminal device is powered off.

It should be noted that there may be a plurality of structures for the sampling module 70. This is not specifically limited in this embodiment of this application.

The signal (namely, the sampled signal) at the fourth terminal 74 of the sampling module 70 may be a sampled current or sampled power.

There are a plurality of methods for determining, by the control module 60 based on the sampled signal, that the PoE terminal device is powered off. For example, if the sampled signal is the sampled current, based on the fact that the sampled current is less than a preset current, the control module 60 may determine that the PoE terminal device is powered off. If the sampled signal is the sampled power, based on the fact that the sampled power is less than the preset power, the control module 60 may determine that the PoE terminal device is powered off.

Similarly, the sampling module 70 is also directly connected to the conductive connection terminal 10, and therefore the optical network unit in this embodiment of this application may further include a second isolation module. The second isolation module is disposed between the fourth terminal 74 of the sampling module 70 and the third terminal 63 of the control module 60, and is configured to perform electric isolation. There may also be a plurality of structures for the second isolation module. This is not specifically limited in this embodiment of this application. For example, an opto-isolator may be included.

Figure 5:
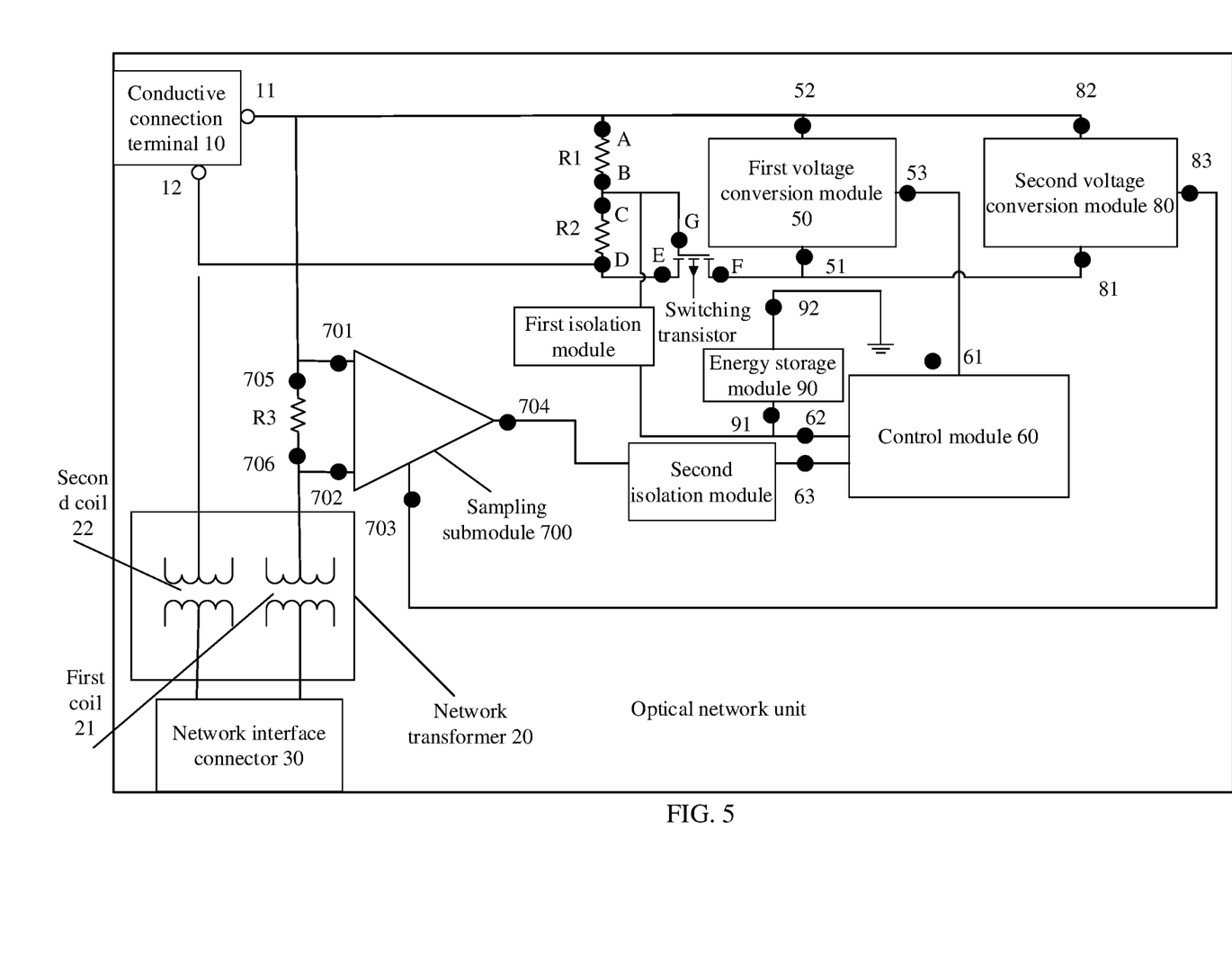
FIG. 5 is a schematic diagram of a structure of a third embodiment of an optical network unit according to an embodiment of this application.

It may be learned from the foregoing description that there may be a plurality of structures for the sampling module 70. The sampling module 70 is described below in detail with reference to FIG. 5. As shown in FIG. 5, the sampling module 70 includes a sampling resistor R3 and a sampling submodule.

A first terminal 705 of the sampling resistor R3 is connected to the positive terminal 11 of the conductive connection terminal 10 or the negative terminal 12 of the conductive connection terminal 10, and a second terminal 706 of the sampling resistor R3 is connected to the network transformer 20. In FIG. 5, the first terminal 705 of the sampling resistor R3 is connected to the positive terminal 11 of the conductive connection terminal 10, and the second terminal 706 of the sampling resistor R3 is connected to the central tap of the primary-side winding of the first coil 21 in the network transformer 20.

A first terminal 701 of the sampling submodule is connected to the first terminal 705 of the sampling resistor R3, and a second terminal 702 of the sampling submodule is connected to the second terminal 706 of the sampling resistor R3. In other words, two input terminals of the sampling submodule (the first terminal 701 of the sampling submodule and the second terminal 702 of the sampling submodule) are connected in parallel to both sides of the sampling resistor R3. Therefore, the sampling submodule may obtain a voltage between both terminals of the sampling resistor R3, and a current flowing through the sampling resistor R3 may be determined based on the voltage between the both terminals of the sampling resistor R3 and resistance of the sampling resistor R3.

A third terminal 703 of the sampling submodule is connected to the third terminal 83 of the second voltage conversion module 80. In other words, power is supplied by using the second voltage conversion module 80.

A fourth terminal 704 of the sampling submodule serves as an output terminal, and is connected to the third terminal 63 of the control module 60. It may be learned from the foregoing description that the second isolation module may be disposed between the fourth terminal 704 of the sampling submodule and the third terminal 63 of the control module 60, and the second isolation module may be an opto-isolator.

The control module 60 is configured to determine, based on a signal at the fourth terminal 704 of the sampling submodule, that the PoE terminal device is powered off.

It should be noted that the signal at the fourth terminal 704 of the sampling submodule may be the current (namely, the sampled current) flowing through the sampling resistor R3, or may be power (namely, the sampled power) of the sampling resistor R3.

A method in which the control module 60 determines, based on the signal at the fourth terminal 704 of the sampling submodule, that the PoE terminal device is powered off is similar to a method in which the control module 60 determines, based on the signal at the fourth terminal of the sampling module, that the PoE terminal device is powered off. For details, refer to the related description in the foregoing embodiment for understanding.

It may be learned from the foregoing description that when the PoE terminal device is powered off, the control module 60 controls the voltage of the control electrode G of the switching transistor to be less than the threshold voltage, so that the switching transistor is cut off. If the switching transistor is cut off, the first voltage conversion module 50 is powered off, and therefore the control module 60 is also powered off. Therefore, the control module 60 cannot maintain the voltage of the control electrode G of the switching transistor in a range less than the threshold voltage.

It takes a specific time to perform the process in which the PoE power supply device detects that the PoE terminal device is powered off, and therefore before the process in which the PoE power supply device detects that the PoE terminal device is powered off ends, the supply voltage of the PoE power supply device remains unchanged. Therefore, after the control module 60 controls the switching transistor to be cut off, under action of the supply voltage, the voltage of the control electrode G of the switching transistor is greater than or equal to the threshold voltage again, in other words, the switching transistor is conducted again. Consequently, impact is imposed on a case in which the PoE power supply device performs one-to-one detection on the PoE terminal device.

Therefore, in another embodiment of the optical network unit provided in this embodiment of this application, the optical network unit further includes an energy storage module 90.

A first terminal 91 of the energy storage module 90 is connected to the second terminal 62 of the control module 60, and a second terminal 92 of the energy storage module 90 is grounded. There may be a plurality of options for the energy storage module 90. For example, a capacitor may be included.

In this embodiment of this application, when the PoE terminal device is powered off, the control module 60 controls the voltage of the control electrode G of the switching transistor to be less than the threshold voltage, so that the switching transistor is cut off, and the control module 60 is powered off. After the control module 60 is powered off, the energy storage module 90 is configured to maintain the voltage of the control electrode G of the switching transistor in the range less than the threshold voltage, so that the switching transistor is always in a cutoff state, to ensure that there is enough time for the PoE power supply device to detect that the PoE terminal device is powered off.

A power supply-related structure in the optical network unit is described above. A signal transmission-related structure in the optical network unit is described below.

Based on the foregoing embodiments, in another embodiment of the optical network unit provided in this embodiment of this application, the optical network unit further includes the control module 60 and an optical-to-electrical conversion module 100.

The optical-to-electrical conversion module 100 is configured to be connected to an optical line terminal. Specifically, the optical-to-electrical conversion module 100 may be connected to the optical line terminal by using an optical fiber. The optical-to-electrical conversion module 100 is configured to convert an optical signal into an electrical signal.

The optical-to-electrical conversion module 100 is connected to the control module 60, and is configured to process the electrical signal from the optical-to-electrical conversion module 100.

The control module 60 is further connected to the network transformer 20, and the control module 60 sends the processed electrical signal to the network transformer 20, to finally send a current to the PoE terminal device by using the network interface connector 30.

For example, if the network transformer 20 includes the first coil 21 and the second coil 22, the control module 60 may be connected to both terminals of the primary-side winding of the first coil 21, and may be connected to both terminals of the primary-side winding of the second coil 22.

The first voltage conversion module 50 is connected to the control module 60. A connection relationship between the first voltage conversion module 50 and the control module 60 is described in the foregoing embodiment, and therefore details are not described herein.

It should be noted that the conductive connection terminal 10 and the optical-to-electrical conversion module 100 may be disposed outside the optical network unit, and are respectively configured to be connected to a cable and an optical fiber. The conductive connection terminal 10 and the optical-to-electrical conversion module 100 may be alternatively disposed in the optical network unit. Specifically, the optical network unit further includes an interface configured to be connected to a photoelectric hybrid cable. The interface may lead an optical fiber and a cable in the photoelectric hybrid cable into the optical network unit. The optical fiber and the cable are respectively connected to the optical-to-electrical conversion module 100 and the conductive connection terminal 10 in the optical network unit.

In this embodiment of this application, the optical-to-electrical conversion module 100 converts an optical signal in the optical fiber into an electrical signal. After processing the electrical signal, the control module 60 sends the electrical signal to the PoE terminal device by using the network transformer 20 and the network interface connector 30, to implement fiber optic communications of the PoE terminal device.

The optical network unit is described above, and a PoE power supply system including the optical network unit is described below.

Figure 6:
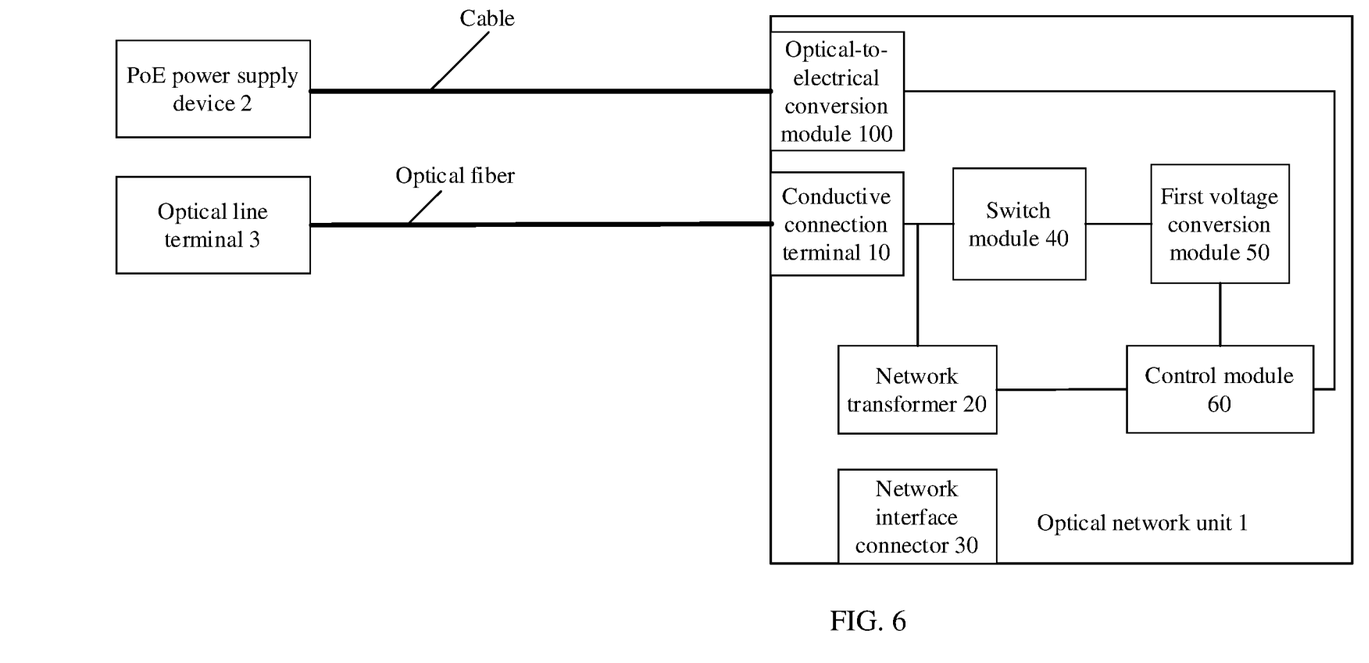
FIG. 6 is a schematic diagram of a structure of a first embodiment of a PoE power supply system according to an embodiment of this application.

As shown in FIG. 6, an embodiment of this application provides an embodiment of a PoE power supply system, including a PoE power supply device 2 and the optical network unit 1 in any one of the foregoing embodiments.

The PoE power supply device 2 is connected to a conductive connection terminal 10 in the optical network unit 1. For example, the PoE power supply device 2 may be connected to the conductive connection terminal 10 in the optical network unit 1 by using a cable.

Based on the foregoing embodiment, in another embodiment of the PoE power supply system provided in this embodiment of this application, the PoE power supply system further includes an optical line terminal 3.

The optical line terminal 3 is connected to an optical-to-electrical conversion module 100 in the optical network unit 1. For example, the optical line terminal 3 may be connected to the optical-to-electrical conversion module 100 in the optical network unit 1 by using an optical fiber.

It should be noted that if the optical network unit 1 is separately connected to the cable and the optical fiber, both the conductive connection terminal 10 and the optical-to-electrical conversion module 100 need to be disposed outside the optical network unit 1. In addition, the optical network unit 1 may be provided with an interface configured to be connected to a photoelectric hybrid cable. The interface may lead an optical fiber and a cable in the photoelectric hybrid cable into the optical network unit 1. The optical fiber and the cable are respectively connected to the optical-to-electrical conversion module 100 and the conductive connection terminal 10 in the optical network unit 1.

Figure 7:
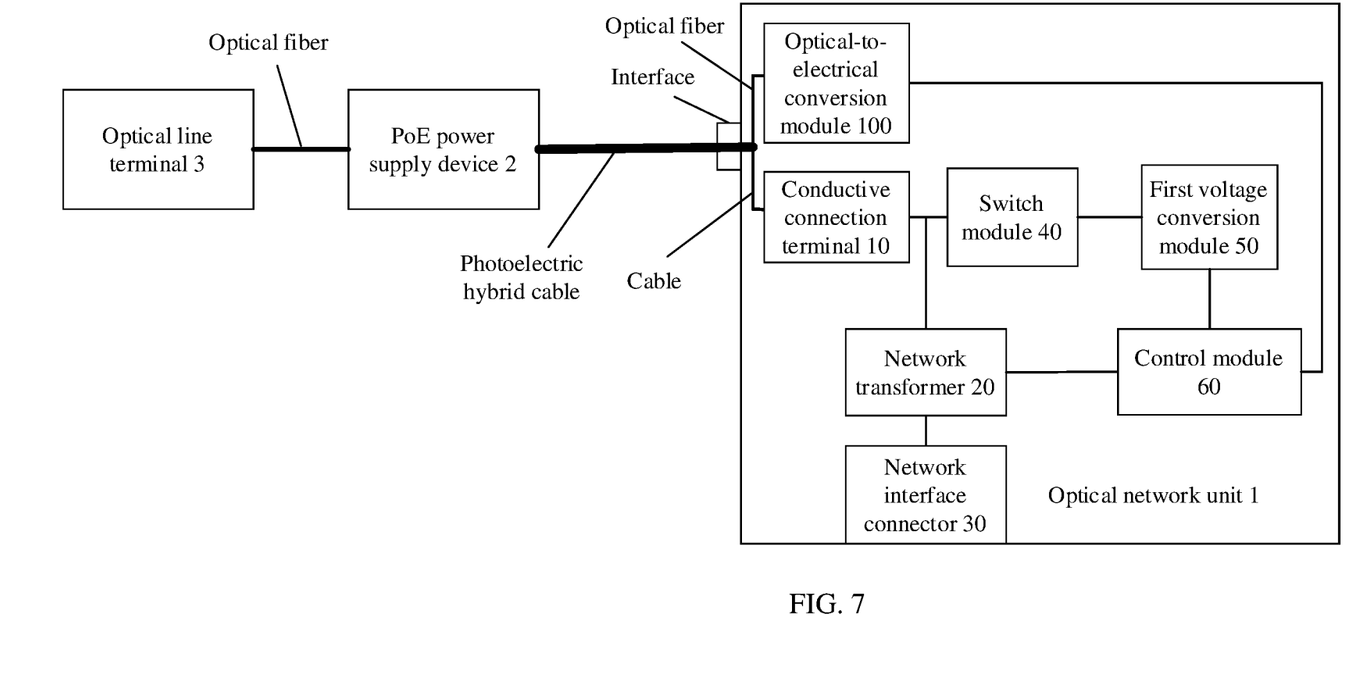
FIG. 7 is a schematic diagram of a structure of a first embodiment of a PoE power supply system according to an embodiment of this application.

Specifically, as shown in FIG. 7, based on the foregoing embodiment, in another embodiment of the PoE power supply system provided in this embodiment of this application, the optical line terminal 3 is connected to an input terminal of the PoE power supply device 2 by using the optical fiber.

An output terminal of the PoE power supply device 2 is connected to the optical network unit 1 by using the photoelectric hybrid cable. Specifically, the optical network unit 1 is provided with the interface. The interface may be connected to the photoelectric hybrid cable, and lead the optical fiber and the cable in the photoelectric hybrid cable into the optical network unit 1.

In the optical network unit 1, the optical fiber in the photoelectric hybrid cable is connected to the optical-to-electrical conversion module 100 in the optical network unit 1, and the cable in the photoelectric hybrid cable is connected to the conductive connection terminal 10 in the optical network unit 1.

In this embodiment of this application, the optical line terminal 3 is not directly connected to the optical network unit 1 by using the optical fiber, but is connected to the input terminal of the PoE power supply device 2 by using the optical fiber, and the output terminal of the PoE power supply device 2 is connected to the optical network unit 1 by using the photoelectric hybrid cable, to transmit an optical signal and supply power by using the photoelectric hybrid cable.

In the specification, claims, and accompanying drawings of embodiments of this application, the terms "first", "second", "third", "fourth", and the like (if any) do not necessarily indicate a specific order or sequence. It should be understood that data used in this way may be interchangeable under proper circumstances, so that the embodiments described herein can be implemented in an order other than those illustrated or described herein. In addition, the term "comprise" or "include" and any other variant thereof are intended to cover a non-exclusive solution. For example, a process, a method, an apparatus, a product, or a device that includes a series of steps or modules is not necessarily limited to the steps or modules that are expressly listed, but may include another step or module that is not expressly listed or inherent to the process, the method, the apparatus, the product, or the device.

What is claimed is:
1. An optical network unit, comprising:
a switch;
a first voltage converter;
a conductive connection terminal, configured to be connected to a power over Ethernet (PoE) power supply device, the conductive connection terminal comprising a positive terminal and a negative terminal;
a network transformer, separately connected to the positive terminal of the conductive connection terminal and the negative terminal of the conductive connection terminal; and a network interface connector connected to the network transformer, wherein the network interface connector is configured to be connected to a PoE terminal device;
wherein the conductive connection terminal is further connected to the first voltage converter using the switch; and
wherein the switch is configured in a manner that:
   before a handshake between the PoE power supply device and the PoE terminal device is completed, the switch is in an open state; and
   after the handshake between the PoE power supply device and the PoE terminal device is completed, the switch is in a closed state.

2. The optical network unit according to claim 1, wherein the switch comprises a first resistor, a second resistor, and a switching transistor, and wherein:
   a first terminal of the first resistor is connected to the positive terminal, a second terminal of the first resistor is connected to a first terminal of the second resistor, and a second terminal of the second resistor is connected to the negative terminal;
   a first electrode of the switching transistor is connected to the negative terminal of the conductive connection terminal, a second electrode of the switching transistor is connected to a first terminal of the first voltage converter, and a control electrode of the switching transistor is connected to the second terminal of the first resistor;
   a second terminal of the first voltage converter is connected to the positive terminal; and
   wherein the switch is configured in a manner that:
      before the handshake between the PoE power supply device and the PoE terminal device is completed, a voltage of the control electrode of the switching transistor is less than a threshold voltage; and
      after the handshake between the PoE power supply device and the PoE terminal device is completed, the voltage of the control electrode of the switching transistor is greater than or equal to the threshold voltage.

3. The optical network unit according to claim 2, wherein the optical network unit further comprises a controller, and wherein:
   a first terminal of the controller is connected to a third terminal of the first voltage converter; and
   a second terminal of the controller is connected to the control electrode of the switching transistor, and is configured to control, when the PoE terminal device is powered off, the voltage of the control electrode of the switching transistor to be less than the threshold voltage.

4. The optical network unit according to claim 3, wherein the optical network unit further comprises a sampling circuit and a second voltage converter, and wherein:
   a first terminal of the second voltage converter is connected to the second electrode of the switching transistor, a second terminal of the second voltage converter is connected to the positive terminal, and a third terminal of the second voltage converter is connected to a first terminal of the sampling circuit;
   a second terminal of the sampling circuit is connected to the positive terminal of the conductive connection terminal or the negative terminal of the conductive connection terminal, and a third terminal of the sampling circuit is connected to the network transformer; and
   a third terminal of the controller is connected to a fourth terminal of the sampling circuit, and is configured to determine, based on a signal at the fourth terminal of the sampling circuit, that the PoE terminal device is powered off.

5. The optical network unit according to claim 4, wherein the sampling circuit comprises a sampling resistor and a sampling subcircuit;
   a first terminal of the sampling resistor is connected to the positive terminal of the conductive connection terminal or the negative terminal of the conductive connection terminal, and a second terminal of the sampling resistor is connected to the network transformer;
   a first terminal of the sampling subcircuit is connected to the first terminal of the sampling resistor, and a second terminal of the sampling subcircuit is connected to the second terminal of the sampling resistor;
   a third terminal of the sampling subcircuit is connected to the third terminal of the second voltage converter;
   a fourth terminal of the sampling subcircuit is connected to the third terminal of the controller; and
   the controller is configured to determine, based on a signal at the fourth terminal of the sampling subcircuit, that the PoE terminal device is powered off.

6. The optical network unit according to claim 3, wherein the optical network unit further comprises an energy storage circuit; and
   wherein a first terminal of the energy storage circuit is connected to the second terminal of the controller, and a second terminal of the energy storage circuit is grounded.

7. The optical network unit according to claim 1, wherein the optical network unit further comprises a controller and an optical-to-electrical converter, and wherein:
   the optical-to-electrical converter is configured to be connected to an optical line terminal;
   the optical-to-electrical converter is connected to the controller;
   the controller is connected to the network transformer; and
   the first voltage converter is connected to the controller.

8. A power over Ethernet (POE) power supply system, comprising:
   a PoE power supply device; and
   an optical network unit, comprising:
      a switch;
      a first voltage converter;
      a conductive connection terminal, configured to be connected to the PoE power supply device, the conductive connection terminal comprising a positive terminal and a negative terminal;
      a network transformer, separately connected to the positive terminal of the conductive connection terminal and the negative terminal of the conductive connection terminal; and
      a network interface connector connected to the network transformer, wherein the network interface connector is configured to be connected to a PoE terminal device;
   wherein the conductive connection terminal is further connected to the first voltage converter using the switch;
   wherein the switch is configured in a manner that:
      before a handshake between the PoE power supply device and the PoE terminal device is completed, the switch is in an open state; and after the handshake between the PoE power supply device and the PoE terminal device is completed, the switch is in a closed state.

9. The PoE power supply system according to claim 8, wherein the PoE power supply system further comprises an optical line terminal; and the optical line terminal is connected to an optical-to-electrical converter in the optical network unit.

10. The PoE power supply system according to claim 9, wherein the optical line terminal is connected to an input terminal of the PoE power supply device using an optical fiber;

an output terminal of the PoE power supply device is connected to the optical network unit by using a photoelectric hybrid cable;

an optical fiber in the photoelectric hybrid cable is connected to the optical-to-electrical converter in the optical network unit; and a cable in the photoelectric hybrid cable is connected to the conductive connection terminal in the optical network unit.

11. The PoE power supply system according to claim 8, wherein the switch comprises a first resistor, a second resistor, and a switching transistor, and wherein:

a first terminal of the first resistor is connected to the positive terminal, a second terminal of the first resistor is connected to a first terminal of the second resistor, and a second terminal of the second resistor is connected to the negative terminal;

a first electrode of the switching transistor is connected to the negative terminal of the conductive connection terminal, a second electrode of the switching transistor is connected to a first terminal of the first voltage converter, and a control electrode of the switching transistor is connected to the second terminal of the first resistor;

a second terminal of the first voltage converter is connected to the positive terminal; and wherein the switch is configured in a manner that:
before the handshake between the PoE power supply device and the PoE terminal device is completed, a voltage of the control electrode of the switching transistor is less than a threshold voltage; and
after the handshake between the PoE power supply device and the PoE terminal device is completed, the voltage of the control electrode of the switching transistor is greater than or equal to the threshold voltage.

12. The PoE power supply system according to claim 11, wherein the optical network unit further comprises a controller, and wherein:

a first terminal of the controller is connected to a third terminal of the first voltage converter; and a second terminal of the controller is connected to the control electrode of the switching transistor, and is configured to control, when the PoE terminal device is powered off, the voltage of the control electrode of the switching transistor to be less than the threshold voltage.

13. The PoE power supply system according to claim 12, wherein the optical network unit further comprises a sampling circuit and a second voltage converter, and wherein:

a first terminal of the second voltage converter is connected to the second electrode of the switching transistor, a second terminal of the second voltage converter is connected to the positive terminal, and a third terminal of the second voltage converter is connected to a first terminal of the sampling circuit;

a second terminal of the sampling circuit is connected to the positive terminal of the conductive connection terminal or the negative terminal of the conductive connection terminal, and a third terminal of the sampling circuit is connected to the network transformer; and a third terminal of the controller is connected to a fourth terminal of the sampling circuit, and is configured to determine, based on a signal at the fourth terminal of the sampling circuit, that the PoE terminal device is powered off.

14. The PoE power supply system according to claim 13, wherein the sampling circuit comprises a sampling resistor and a sampling subcircuit;

a first terminal of the sampling resistor is connected to the positive terminal of the conductive connection terminal or the negative terminal of the conductive connection terminal, and a second terminal of the sampling resistor is connected to the network transformer;

a first terminal of the sampling subcircuit is connected to the first terminal of the sampling resistor, and a second terminal of the sampling subcircuit is connected to the second terminal of the sampling resistor;

a third terminal of the sampling subcircuit is connected to the third terminal of the second voltage converter;

a fourth terminal of the sampling subcircuit is connected to the third terminal of the controller; and the controller is configured to determine, based on a signal at the fourth terminal of the sampling subcircuit, that the PoE terminal device is powered off.

15. The PoE power supply system according to claim 12, wherein the optical network unit further comprises an energy storage circuit; and wherein a first terminal of the energy storage circuit is connected to the second terminal of the controller, and a second terminal of the energy storage circuit is grounded.

16. The PoE power supply system according to claim 8, wherein the optical network unit further comprises a controller and an optical-to-electrical converter, and wherein:

the optical-to-electrical converter is configured to be connected to an optical line terminal;

the optical-to-electrical converter is connected to the controller;

the controller is connected to the network transformer; and the first voltage converter is connected to the controller.

17. A system, comprising:
a power over Ethernet (POE) power supply device;
a PoE terminal device; and
an optical network unit, comprising:
a switch;
a first voltage converter;
a conductive connection terminal, configured to be connected to the PoE power supply device, the conductive connection terminal comprising a positive terminal and a negative terminal;
a network transformer, separately connected to the positive terminal of the conductive connection terminal and the negative terminal of the conductive connection terminal; and
a network interface connector connected to the network transformer, wherein the network interface connector is configured to be connected to the PoE terminal device;

wherein the conductive connection terminal is further connected to the first voltage converter using the switch;
wherein the switch is configured in a manner that:
before a handshake between the PoE power supply device and the PoE terminal device is completed, the switch is in an open state; and
after the handshake between the PoE power supply device and the PoE terminal device is completed, the switch is in a closed state.

18. The system according to claim 17, wherein the system further comprises an optical line terminal; and
wherein the optical line terminal is connected to an optical-to-electrical converter in the optical network unit.

19. The system according to claim 18, wherein the optical line terminal is connected to an input terminal of the PoE power supply device using an optical fiber;
wherein an output terminal of the PoE power supply device is connected to the optical network unit using a photoelectric hybrid cable;
wherein an optical fiber in the photoelectric hybrid cable is connected to the optical-to-electrical converter in the optical network unit; and
wherein a cable in the photoelectric hybrid cable is connected to the conductive connection terminal in the optical network unit.

20. The system according to claim 17, wherein the switch comprises a first resistor, a second resistor, and a switching transistor, and wherein:
a first terminal of the first resistor is connected to the positive terminal, a second terminal of the first resistor is connected to a first terminal of the second resistor, and a second terminal of the second resistor is connected to the negative terminal;
a first electrode of the switching transistor is connected to the negative terminal of the conductive connection terminal, a second electrode of the switching transistor is connected to a first terminal of the first voltage converter, and a control electrode of the switching transistor is connected to the second terminal of the first resistor;
a second terminal of the first voltage converter is connected to the positive terminal; and
wherein the switch is configured in a manner that:
before the handshake between the PoE power supply device and the PoE terminal device is completed, a voltage of the control electrode of the switching transistor is less than a threshold voltage; and
after the handshake between the PoE power supply device and the PoE terminal device is completed, the voltage of the control electrode of the switching transistor is greater than or equal to the threshold voltage.

* * * * *

UNITED STATES PATENT AND TRADEMARK OFFICE
CERTIFICATE OF CORRECTION

PATENT NO. : 12,081,349 B2  
APPLICATION NO. : 17/937038  
DATED : September 3, 2024  
INVENTOR(S) : Li et al.

Page 1 of 1

It is certified that error appears in the above-identified patent and that said Letters Patent is hereby corrected as shown below:

In the Claims

In Column 18, in Claim 8, Line 43, delete "(POE)" and insert -- (PoE) --.

In Column 20, in Claim 17, Line 51, delete "(POE)" and insert -- (PoE) --.

Signed and Sealed this  
Eighth Day of October, 2024

Katherine Kelly Vidal  
*Director of the United States Patent and Trademark Office*